United States Patent
Williams et al.

(10) Patent No.: US 9,376,031 B2
(45) Date of Patent: Jun. 28, 2016

(54) RECHARGEABLE ENERGY STORAGE SYSTEM (RESS) THERMAL CONDITIONING BASED ON RESS STATE OF CHARGE THRESHOLD

(75) Inventors: Jonathan K. Williams, Belleville, MI (US); Matthew Simonini, Milford, MI (US); Kyle Holihan, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1091 days.

(21) Appl. No.: 13/335,754

(22) Filed: Dec. 22, 2011

(65) Prior Publication Data
US 2013/0164573 A1   Jun. 27, 2013

(51) Int. Cl.
*B60L 11/18* (2006.01)
*H01M 10/48* (2006.01)
(Continued)

(52) U.S. Cl.
CPC ............ *B60L 11/187* (2013.01); *H01M 10/48* (2013.01); *H01M 10/613* (2015.04); *H01M 10/615* (2015.04); *H01M 10/625* (2015.04); *H01M 10/635* (2015.04); *B60L 11/1861* (2013.01); *B60L 11/1874* (2013.01); *B60L 11/1875* (2013.01); *B60L 2240/545* (2013.01); *B60L 2240/662* (2013.01); *H01M 10/486* (2013.01); *H01M 10/6569* (2015.04); *H01M 10/66* (2015.04); *H01M 2220/20* (2013.01); *Y02T 10/705* (2013.01); *Y02T 10/7005* (2013.01); *Y02T 10/7011* (2013.01)

(58) Field of Classification Search
CPC ...................... H01M 10/5004; H01M 10/5006; H01M 10/5002; H01M 10/50; H01M 10/5024; B60L 11/1874; B60L 11/1875; B60L 2240/545; B60L 11/187; B60L 11/1861; B60L 2240/662
USPC ...................................... 320/150, 153; 429/62
See application file for complete search history.

(56) References Cited

U.S. PATENT DOCUMENTS 5,982,152 A * 11/1999 Watanabe ............. H02J 7/0091
320/137
8,082,743 B2 * 12/2011 Hermann et al. ................ 62/129
(Continued)

FOREIGN PATENT DOCUMENTS

| CN | 100554024 C | 10/2009 |
| CN | 101633306 A | 1/2010 |
| CN | 101987580 A | 3/2011 |

OTHER PUBLICATIONS

Liu, Wei, et al., Method and System for Determining a State of Charge of a Battery, U.S. Appl. No. 12/238,204, filed Sep. 25, 2008.
(Continued)

*Primary Examiner* — Yalkew Fantu
*Assistant Examiner* — Manuel Hernandez
(74) *Attorney, Agent, or Firm* — Ingrassia Fisher & Lorenz, P.C.

(57) ABSTRACT

Methods, systems, and vehicles are provided that provide for thermal conditioning of a vehicle rechargeable energy storage system (RESS). A thermal conditioning system is coupled to the RESS, and is configured to thermally condition the RESS. A control system is coupled to the thermal conditioning system, and is configured to estimate a state of charge for the RESS and provide instructions for the thermal conditioning system to thermally conditioning the RESS based on the state of charge.

15 Claims, 8 Drawing Sheets

(51) Int. Cl.
*H01M 10/625* (2014.01)
*H01M 10/615* (2014.01)
*H01M 10/635* (2014.01)
*H01M 10/613* (2014.01)
*H01M 10/6569* (2014.01)
*H01M 10/66* (2014.01)

(56) References Cited

U.S. PATENT DOCUMENTS 8,555,659 B2 * 10/2013 Hermann et al. ............... 62/115
2007/0152640 A1 * 7/2007 Sasaki et al. .................. 320/150
2010/0116574 A1 5/2010 Gilmore
2010/0212339 A1 * 8/2010 Kelty et al. ..................... 62/129
2012/0046815 A1 * 2/2012 Hermann et al. ............... 701/22
2012/0200257 A1 * 8/2012 Schwarz ............... H01M 10/42
320/109

OTHER PUBLICATIONS

Liu, Wei, et al., Method and System for Determining a State of Charge of a Battery Based on a Transient Response, U.S. Appl. No. 12/238,224, filed Sep. 25, 2008.
Koch, Brian J., et al., Method and System for Determining a State of Charge of a Battery, U.S. Appl. No. 11/947,466, filed Nov. 29, 2007.

* cited by examiner

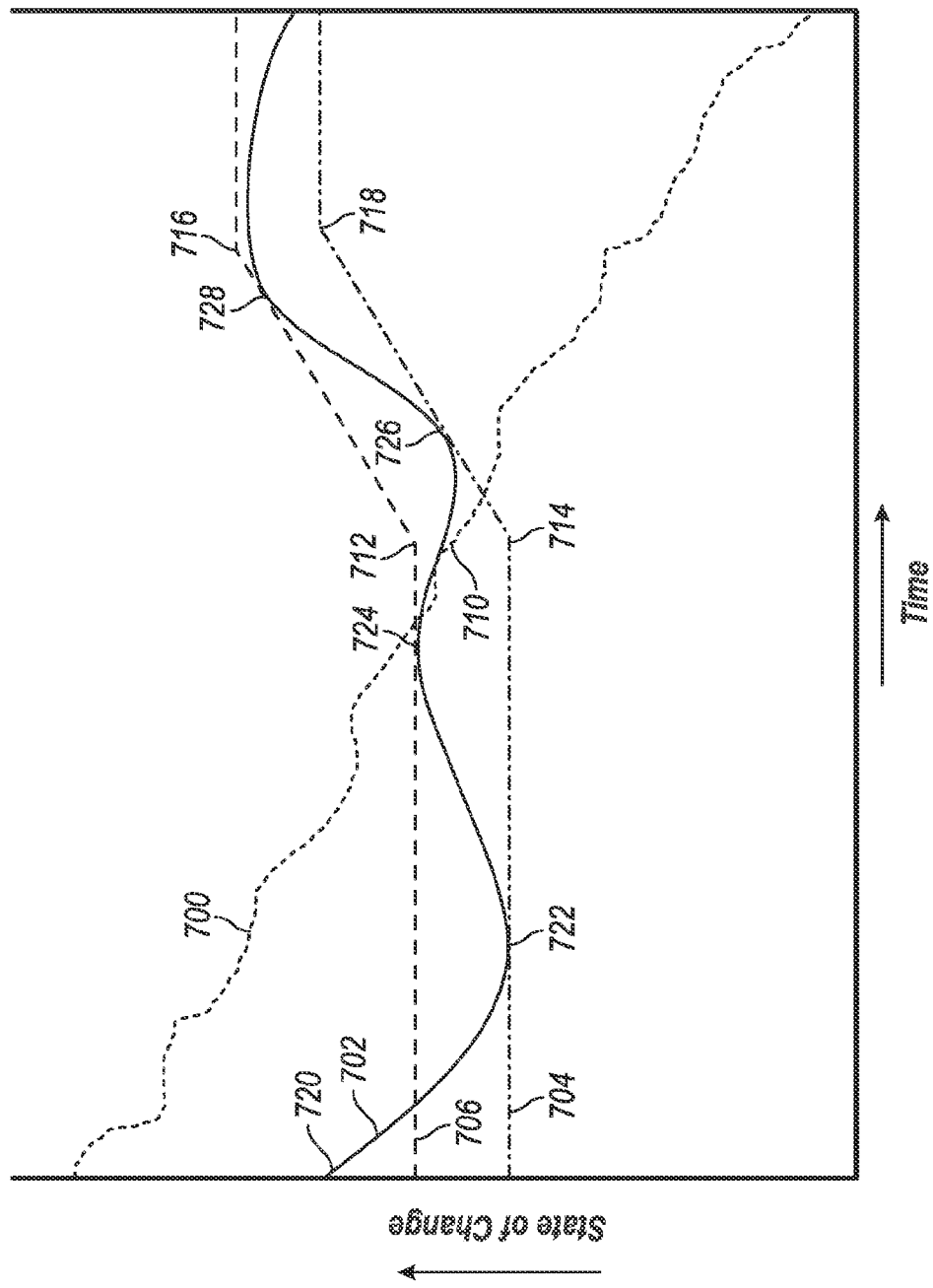

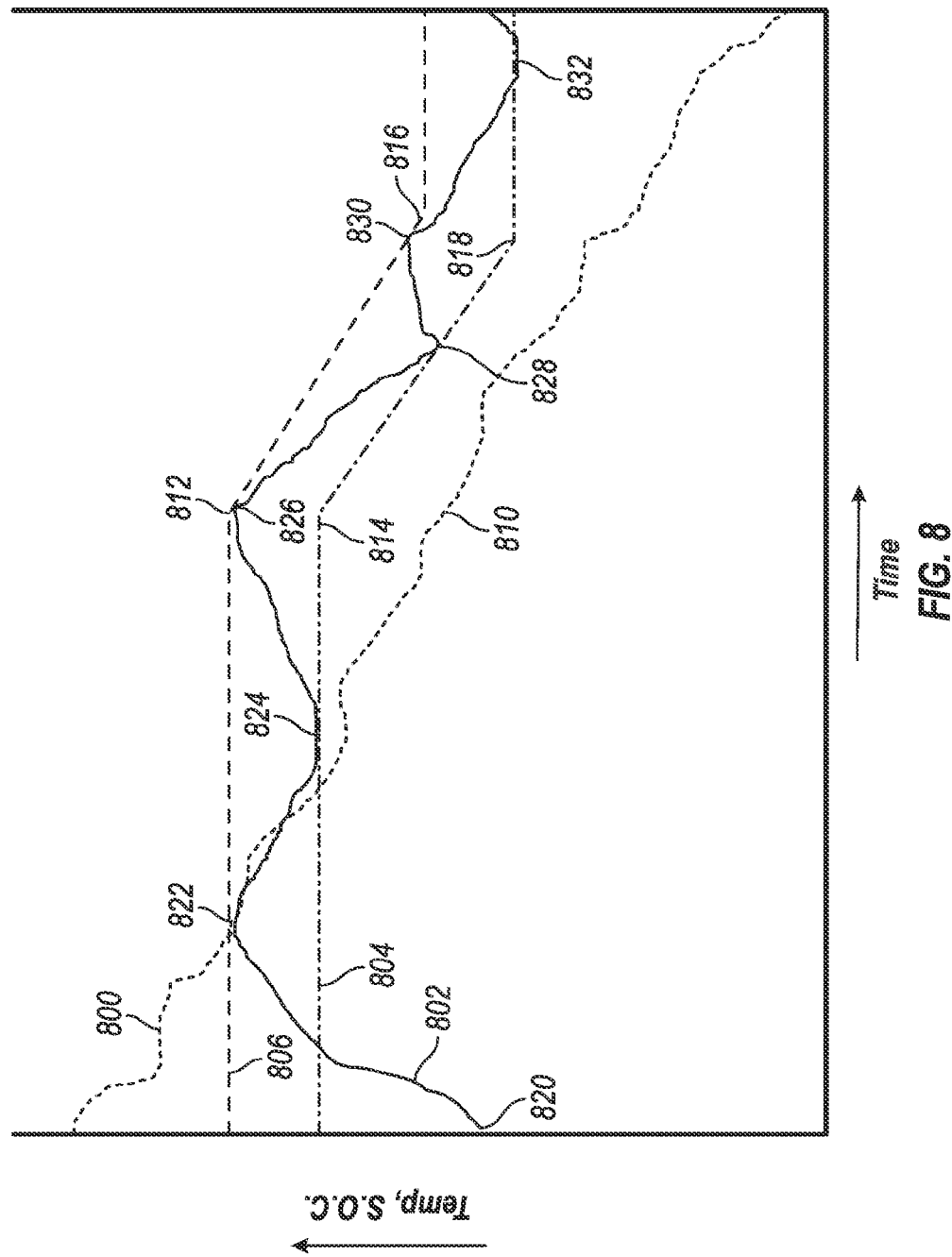

US 9,376,031 B2

RECHARGEABLE ENERGY STORAGE SYSTEM (RESS) THERMAL CONDITIONING BASED ON RESS STATE OF CHARGE THRESHOLD

TECHNICAL FIELD

The present disclosure generally relates to the field of vehicles and, more specifically, to methods and systems for thermal conditioning of rechargeable energy storage systems of vehicles.

BACKGROUND

Certain vehicles, particularly electric vehicles and hybrid electric vehicles, have rechargeable energy storage systems (RESS), such as batteries. It is generally desired to maintain a temperature of the RESS within certain limits. The RESS temperature may be maintained by continuously monitoring the voltage and current values associated with the RESS, and by thermally conditioning the RESS when the RESS temperature approaches an upper or lower RESS temperature limit. However, this type of RESS conditioning may not always be optimal, for example if there is limited life remaining in the RESS.

Accordingly, it is desirable to provide improved methods for thermal conditioning of vehicle RESS, for example when there is limited life remaining in the RESS. It is also desirable to provide improved systems for such thermal conditioning of vehicle RESS, and for vehicles that include such methods and systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for thermally conditioning a rechargeable energy storage system (RESS) of a vehicle. The method comprises the steps of estimating a state of charge for the RESS using a processor and thermally conditioning the RESS based on the state of charge.

In accordance with another exemplary embodiment, a control system is provided for thermally conditioning a rechargeable energy storage system (RESS) of a vehicle. The control system comprises a thermal conditioning system and a controller. The thermal conditioning system is configured to thermally condition the RESS. The controller is coupled to the thermal conditioning system, and is configured to estimate a state of charge for the RESS and provide instructions for the thermal conditioning system to thermally conditioning the RESS based on the state of charge.

In accordance with a further exemplary embodiment, a vehicle is provided. The vehicle comprises a drive system, a thermal conditioning system, and a control system. The drive system includes a rechargeable energy storage system (RESS). The thermal conditioning system is coupled to the RESS, and is configured to thermally condition the RESS. The control system is coupled to the thermal conditioning system, and is configured to estimate a state of charge for the RESS and provide instructions for the thermal conditioning system to thermally conditioning the RESS based on the state of charge.

BRIEF DESCRIPTION OF THE DRAWINGS

The present disclosure will hereinafter be described in conjunction with the following drawing figures, wherein like numerals denote like elements, and wherein:

FIG. 7 is a graphical representation of certain steps of the process of FIGS. 4-6 under relatively warm environmental conditions, in accordance with exemplary embodiments; and FIG. 8 is a graphical representation of certain steps of the process of FIGS. 4-6 under relatively cool environmental conditions, in accordance with exemplary embodiments;

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
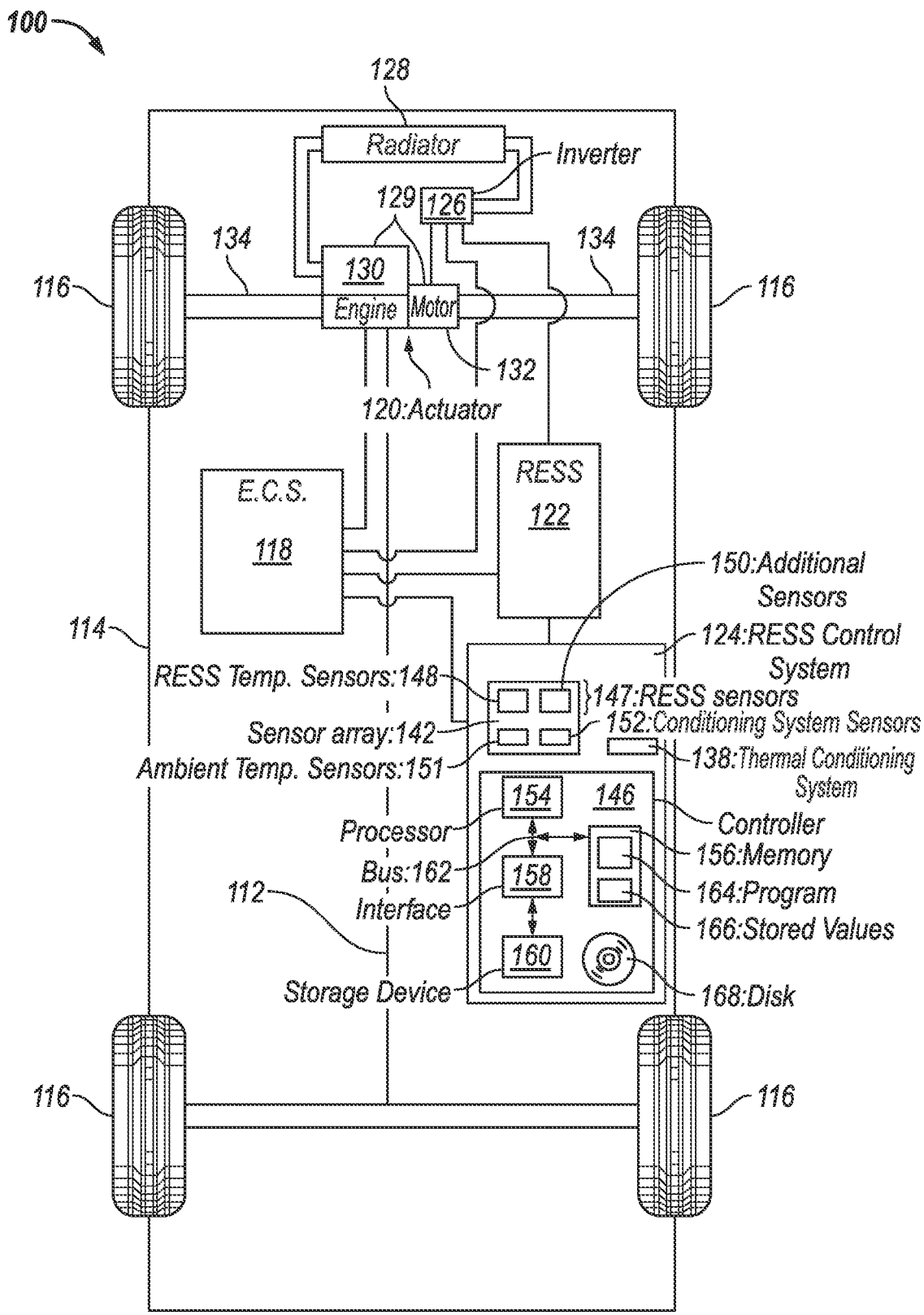
FIG. 1 is a functional block diagram of a vehicle that includes a rechargeable energy storage system (RESS) and a control system for thermally conditioning the RESS, in accordance with an exemplary embodiment.

FIG. 1 illustrates a vehicle 100, or automobile, according to an exemplary embodiment. As described in greater detail further below, the vehicle 100 is configured to thermally condition a rechargeable energy storage system (RESS) of the vehicle 100 using temperature limits that are dependent upon a state of charge of the RESS.

The vehicle 100 includes a chassis 112, a body 114, four wheels 116, and an electronic control system 118. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 120, the above-referenced RESS 122, an RESS control system 124, a power inverter assembly (or inverter) 126, and a radiator 128. The actuator assembly 120 includes at least one propulsion system 129 mounted on the chassis 112 that drives the wheels 116.

Specifically, as depicted in FIG. 1, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130. In certain other embodiments, the vehicle 100 may comprise a pure electric vehicle, without a combustion engine 130.

The RESS 122 is electrically connected to the inverter 126. In one embodiment, the RESS 122 is mounted on the chassis 112. In one such embodiment, the RESS 122 is disposed within a cockpit of the vehicle. In another embodiment, the RESS 122 is disposed underneath a cockpit of the vehicle. The RESS 122 preferably comprises a rechargeable battery having a pack of battery cells. In one embodiment, the RESS 122 comprises a lithium iron phosphate battery, such as a nanophosphate lithium ion battery. Together the RESS 122 and the propulsion system 129 provide a drive system to propel the vehicle 100. The RESS 122 is thermally conditioned by the RESS control system 124, as described in detail below.

As depicted in FIG. 1, the RESS control system 124 includes a thermal conditioning system 138, a sensor array 142, and one or more controllers 146. The RESS control system 124 is coupled to, and at least facilitates control over, the RESS 122. In addition, although not illustrated as such, the RESS control system 124 (and/or one or more components thereof) may be integral with the electronic control system 118 and may also include one or more power sources. In certain embodiments, the controller(s) 146 may comprise multiple controllers and/or systems working together. For the sake of brevity, such controllers and/or systems are referenced collectively herein as the controller 146.

The sensor array 142 includes one or more RESS sensors 147, ambient temperature sensors 151, and thermal conditioning system sensors 152, among other various possible sensors. The RESS sensors 147 are preferably disposed inside the RESS 122. The RESS sensors 147 preferably include one or more RESS temperature sensors 148 and additional RESS sensors 150. The RESS temperature sensors 148 measure a temperature of the RESS 122, most preferably a temperature inside the RESS 122. The additional RESS sensors 150 measure parameters that may be used in estimating a state of charge for the RESS 122. In one embodiment, the additional RESS sensors 150 include one or more RESS current sensors that measure current of the RESS 122. In another embodiment, the additional RESS sensors 150 include one or more RESS voltage sensors that measure voltage of the RESS 122. The RESS sensors 147 provide signals and/or information pertaining to the measurements to the controller 146 for processing and for use in thermally conditioning the RESS 122.

The ambient temperature sensors 151 are preferably disposed proximate but outside the RESS 122. The ambient temperature sensors 151 measure an ambient temperature outside (and preferably adjacent to) the RESS 122. The ambient temperature sensors 151 provide signals and/or information pertaining to the measurements to the controller 146 for processing and for use in thermally conditioning the RESS 122.

The thermal conditioning system sensors 152 are preferably disposed within or proximate to the thermal conditioning system 138. The thermal conditioning system sensors 152 measure one or more values for use by the thermal conditioning system 138 (such as a temperature within the thermal conditioning system 138 or of a coolant fluid thereof, by way of example) for thermally conditioning the RESS 122 based on instructions provided by the controller 146.

The controller 146 is coupled to the sensor array 142, the RESS 122, and the electronic control system 118. The controller 146 utilizes the data and information from the measured values from the sensor array 142 in order to determine a state of charge for the RESS 122 and to thermally condition the RESS 122 based on RESS temperature limits that are dependent upon the state of charge. This is preferably performed in accordance with the process 400 described further below in connection with FIGS. 4-8.

As depicted in FIG. 1, the controller 146 comprises a computer system. In certain embodiments, the controller 146 may also include one or more of the sensors 142, the electronic control system 118 and/or portions thereof, and/or one or more other devices. In addition, it will be appreciated that the controller 146 may otherwise differ from the embodiment depicted in FIG. 1. For example, the controller 146 may be coupled to or may otherwise utilize one or more remote computer systems and/or other control systems.

In the depicted embodiment, the computer system of the controller 146 includes a processor 154, a memory 156, an interface 158, a storage device 160, and a bus 162. The processor 154 performs the computation and control functions of the controller 146, and may comprise any type of processor or multiple processors, single integrated circuits such as a microprocessor, or any suitable number of integrated circuit devices and/or circuit boards working in cooperation to accomplish the functions of a processing unit. During operation, the processor 154 executes one or more programs 164 contained within the memory 156 and, as such, controls the general operation of the controller 146 and the computer system of the controller 146, preferably in executing the steps of the processes described herein, such as the steps of the process 400 described further below in connection with FIGS. 4-8.

The memory 156 can be any type of suitable memory. This would include the various types of dynamic random access memory (DRAM) such as SDRAM, the various types of static RAM (SRAM), and the various types of non-volatile memory (PROM, EPROM, and flash). The bus 162 serves to transmit programs, data, status and other information or signals between the various components of the computer system of the controller 146. In a preferred embodiment, the memory 156 stores the above-referenced program 164 along with one or more stored values 166 for use in thermal conditioning of the RESS 122. In certain examples, the memory 156 is located on and/or co-located on the same computer chip as the processor 154.

The interface 158 allows communication to the computer system of the controller 146, for example from a system driver and/or another computer system, and can be implemented using any suitable method and apparatus. It can include one or more network interfaces to communicate with other systems or components. The interface 158 may also include one or more network interfaces to communicate with technicians, and/or one or more storage interfaces to connect to storage apparatuses, such as the storage device 160.

The storage device 160 can be any suitable type of storage apparatus, including direct access storage devices such as hard disk drives, flash systems, floppy disk drives and optical disk drives. In one exemplary embodiment, the storage device 160 comprises a program product from which memory 156 can receive a program 164 that executes one or more embodiments of one or more processes of the present disclosure, such as the steps of the process 400 of FIGS. 4-8, described further below. In another exemplary embodiment, the program product may be directly stored in and/or otherwise accessed by the memory 156 and/or a disk (e.g., disk 168), such as that referenced below.

The bus 162 can be any suitable physical or logical means of connecting computer systems and components. This includes, but is not limited to, direct hard-wired connections, fiber optics, infrared and wireless bus technologies. During operation, the program 164 is stored in the memory 156 and executed by the processor 154.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium storing the program and containing computer instructions stored therein for causing a computer processor (such as the processor 154) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 146 may also otherwise differ from the embodiment depicted in FIG. 1, for example in that the computer system of the controller 146 may be coupled to or may otherwise utilize one or more remote computer systems and/or other control systems.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the combustion engine 130 and the inverter 126.

The thermal conditioning system 138 thermally conditions the RESS 122. Specifically, the thermal conditioning system 138 utilizes heating and cooling techniques, as appropriate, for heating or cooling the RESS 122, based on instructions provided by the controller 146 (preferably by the processor 154 thereof). The heating and cooling techniques are selected so as to attain the desired heating or cooling of the RESS 122 while optimizing energy efficiency.

Figure 2:
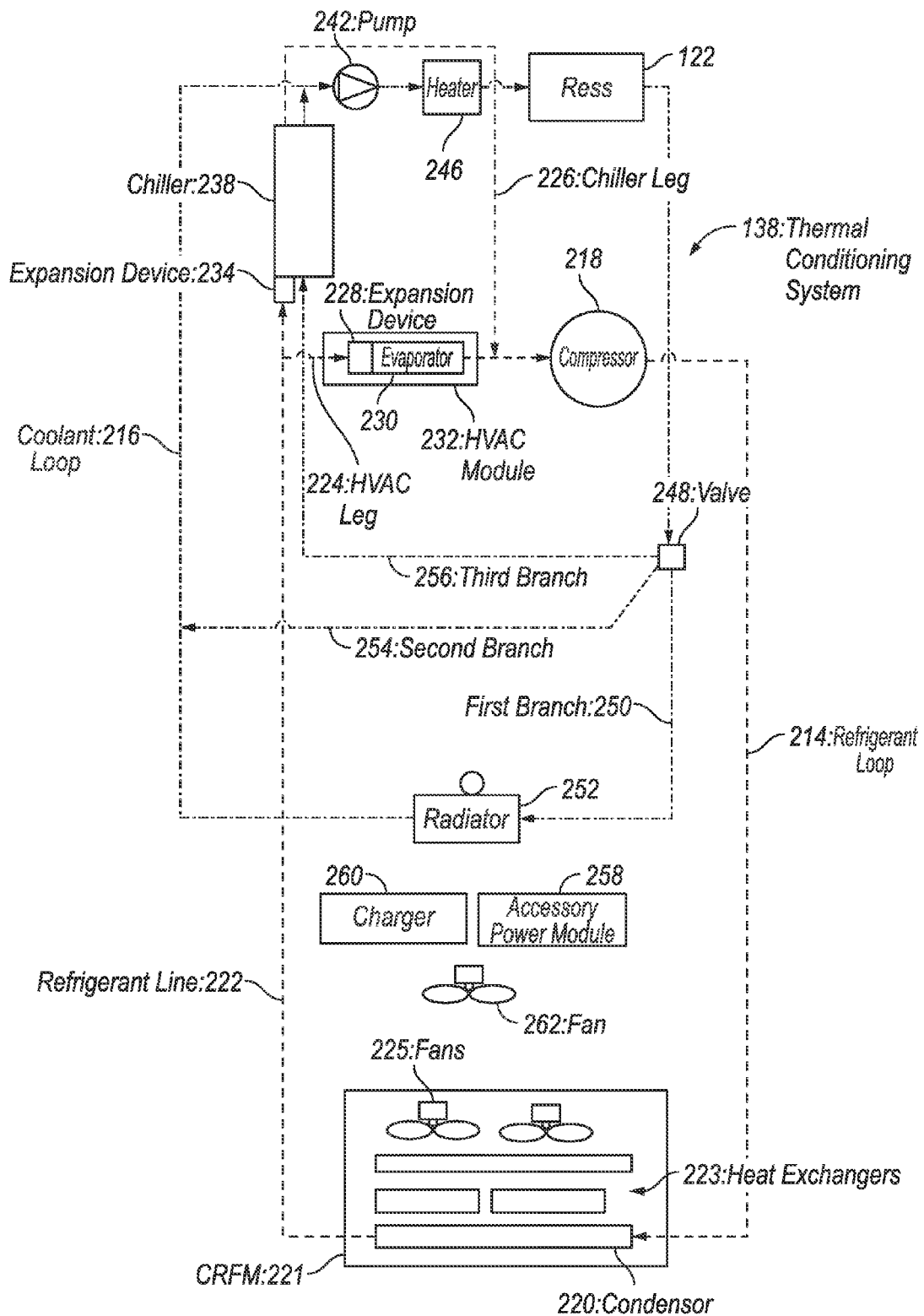
FIG. 2 is a schematic view of a thermal conditioning system of the control system of FIG. 1, in accordance with an exemplary embodiment.

With reference to FIG. 2, a schematic view is provided of the thermal conditioning system 138 of FIG. 1, in accordance with a first exemplary embodiment. As depicted in FIG. 2, the thermal conditioning system 138 includes a refrigerant loop 214 and a coolant loop 216. The thermal conditioning system 138 depicted in FIG. 2 may be used, for example, in a plug-in hybrid electric vehicle or an extended range electric vehicle.

Each of the components of the thermal conditioning system 138 are preferably controlled directly or indirectly via instructions provided by the controller 146 of FIG. 1, most preferably by the processor 154 thereof. Specifically, the thermal conditioning system 138 thermally conditions the RESS 122 of FIG. 1 in a manner that maintains the temperature of the RESS 122 within a temperature range that is dependent upon the state of charge of the RESS 122, based on instructions provided by the controller 146 of FIG. 1, and in accordance with the process 400 described below in connection with FIGS. 4-8.

As depicted in FIG. 2, the thermal conditioning system 138 includes a refrigerant loop 214 and a coolant loop 216. The refrigerant loop 214 includes a refrigerant compressor 218 and a condenser 220. In certain examples, the refrigerant loop 214 and the refrigerant compressor 218 may be part of a condenser, radiator, fan module (CRFM) 221. The CRFM 221 may include other heat exchangers 223 and fans 225 used to heat or cool fluids from other vehicle systems as well as from the RESS 122 of FIG. 1. In a preferred embodiment, the refrigerant compressor 218 is electrically driven, and is capable of adjusting the speed of the compressor during operation.

The condenser 220 directs refrigerant into a refrigerant line 222 that splits into a heat, ventilation, and air conditioning (HVAC) leg 224 and a chiller leg 226 of the refrigerant loop 214. The HVAC leg 224 directs the refrigerant through an expansion device 228 and into an evaporator 230, which is located in an HVAC module 232. In some embodiments, refrigerant exiting the evaporator 230 may be directed back to the refrigerant compressor 218 through an accumulator (not shown).

The chiller leg 226 directs the refrigerant through an expansion device 234 and then through a chiller 238. The chiller 238 preferably comprises a refrigerant-to-coolant heat exchanger. Refrigerant exiting the chiller 238 is directed back to the refrigerant compressor 218 via chiller leg 226.

The chiller 238 is also in fluid communication with the coolant loop 216. The dashed lines in FIG. 2 (and, similarly, in FIG. 3, described further below) represent lines through which refrigerant flows. The dash-dot lines represent lines through which a coolant liquid flows. The coolant liquid may be a conventional liquid mixture such as an ethylene glycol and water mix, or may be some other type of liquid with suitable heat transfer characteristics.

As depicted in FIG. 2, the coolant loop 216 includes a coolant pump 242 that pumps the coolant through the coolant loop 216. The coolant pump 242 is controllable to vary the flow rate of the coolant flowing through the coolant loop 216. The coolant loop 216 also includes the RESS 122 of FIG. 1, and an electric coolant heater 246. The coolant flowing through the RESS 122 is used to cool or warm the RESS as needed. The electric coolant heater 246 can be activated to heat the coolant flowing through it in order to provide warming to the RESS 122.

A four port coolant routing valve 248 is located in the coolant loop 216. The routing valve 248 can be selectively actuated to direct the coolant through three different branches of the coolant loop 216. A first branch 250 includes an RESS radiator 252, which is positioned to have air flowing through it. The RESS radiator 252 may be mounted near an accessory power module 258 and an RESS charger 260, which have air directed through them by a controllable fan 262. A second branch 254 forms a coolant bypass line where the coolant does not flow through the RESS radiator 252 or the chiller 238. A third branch 256 directs the coolant through the chiller 238. All three branches join together to direct the coolant back through the RESS 122.

Figure 3:
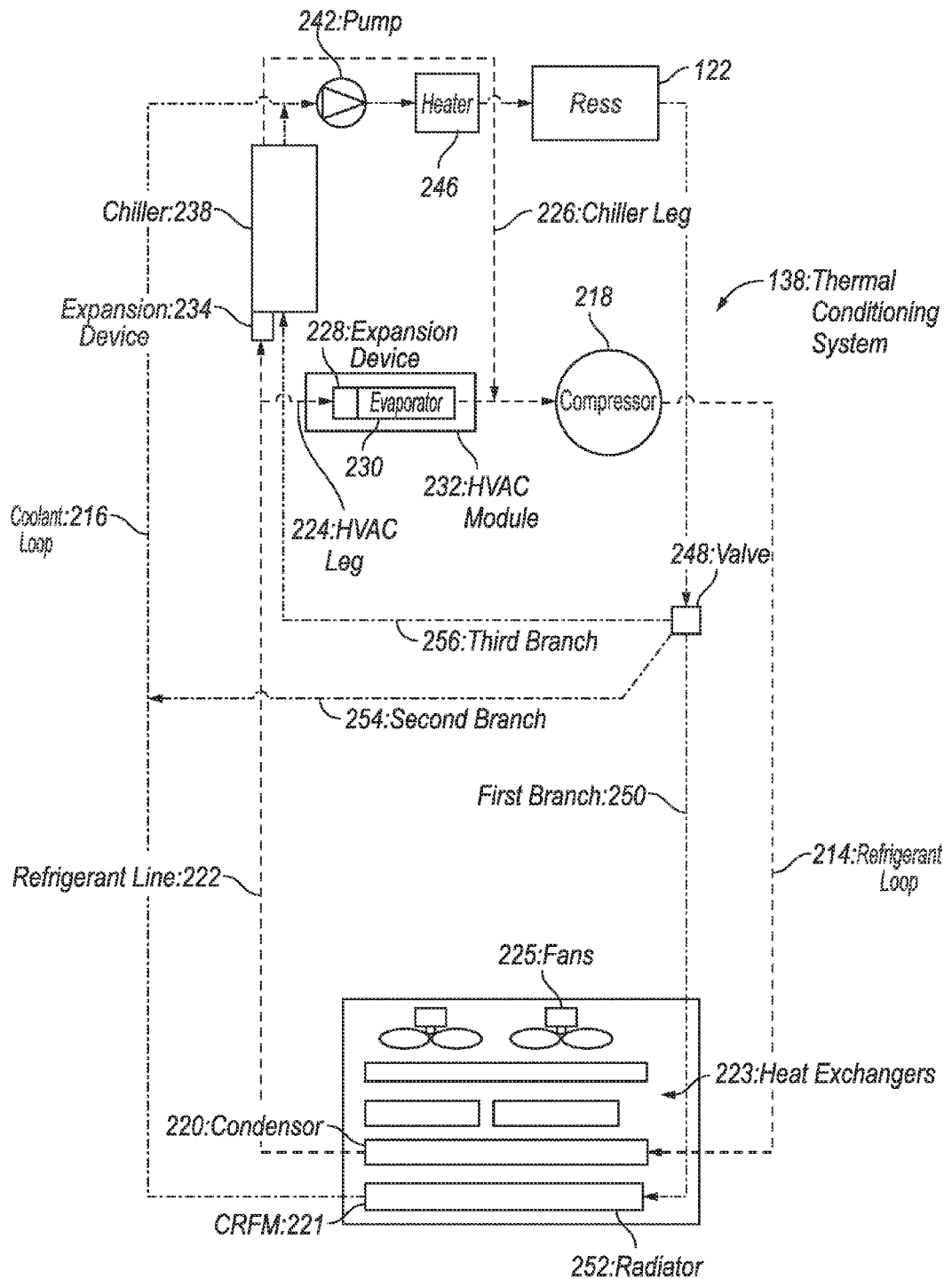
FIG. 3 is a schematic view of a thermal conditioning system of the control system of FIG. 1, in accordance with an alternate exemplary embodiment.

FIG. 3 illustrates another example of the thermal conditioning system 138, in accordance with a second exemplary embodiment. The embodiment of FIG. 3 may be used, for example, in connection with an extended range electric vehicle. Because the embodiment of FIG. 3 is similar to that of FIG. 2, similar element numbers will be used for similar elements, which also have similar functions as those described above in connection with FIG. 2. In the embodiment of FIG. 3, the RESS radiator 252 may be part of the CRFM 221. While the two embodiments of FIGS. 2 and 3 may have somewhat different configurations, the processes, discussed below, for cooling and warming the RESS 122 may be essentially the same, if so desired.

Similar to the embodiment of FIG. 2, in FIG. 3 each of the components of the thermal conditioning system 138 are similarly preferably controlled directly or indirectly via instructions provided by the controller 146 of FIG. 1, most preferably by the processor 154 thereof. Specifically, the thermal conditioning system 138 thermally conditions the RESS 122 of FIG. 1 in a manner that maintains the temperature of the RESS 122 within a temperature range that is dependent upon the state of charge of the RESS 122, based on instructions provided by the controller 146 of FIG. 1, and in accordance with the process 400 described below in connection with FIGS. 4-8, based on instructions provided by the controller 146 of FIG. 1, and in accordance with the process 400 described below in connection with FIGS. 4-8.

Figure 4:
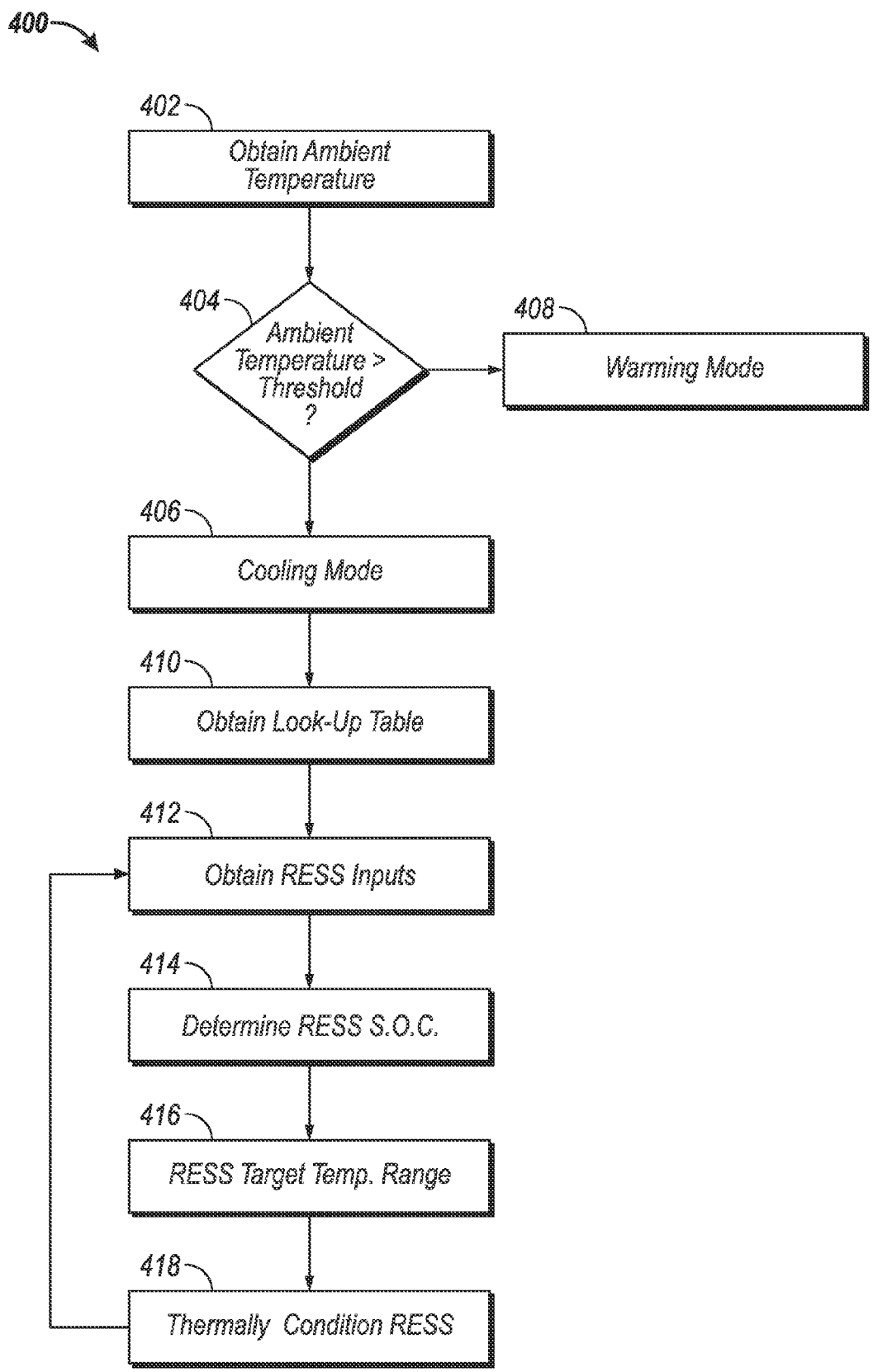
FIG. 4 is a flowchart of a process for thermally conditioning an RESS for a vehicle, and that can be used in connection with the vehicle, the RESS, and the control system of FIG. 1 (including the thermal conditioning systems of FIGS. 2 and 3), in accordance with an exemplary embodiment.

FIG. 4 is a flowchart of a process 400 for thermally conditioning an RESS for a vehicle, in accordance with an exemplary embodiment. The process 400 thermally conditions a rechargeable energy storage system (RESS) of a vehicle using temperature limits that are dependent upon a state of charge of the RESS. The process 400 can be utilized in connection with the vehicle 100, the RESS 122, and the RESS control system 124 of FIG. 1, including the thermal conditioning system 138 embodiments of FIGS. 2 and 3. The process 400 will also be discussed below with reference to FIGS. 5 and 6, which provide flowcharts for certain steps or sub-algorithms for the process 400 of FIG. 4 in accordance with exemplary embodiments. The process 400 will also be discussed below with reference to FIGS. 7 and 8, which graphically illustrate exemplary RESS temperature ranges in accordance with certain exemplary embodiments.

An ambient temperature is obtained (step 402). The ambient temperature preferably comprises a temperature outside and adjacent to the RESS 122 of FIG. 1. The ambient temperature is preferably measured by one or more ambient temperature sensors 151 of FIG. 1 and provided to the controller 146 of FIG. 1, and most preferably to the processor 154 thereof, for processing.

A determination is then made as to whether an ambient temperature is greater than a predetermined threshold (step 404). This determination is preferably made by the processor 154 of FIG. 1. If it is determined that the ambient temperature is greater than the predetermined threshold, then the controller 146 enters a cooling mode for the RESS 122 of FIG. 1 (step 406). Conversely, if it is determined that the ambient temperature is less than the predetermined threshold, then the controller 146 enters a warming mode for the RESS 122 of FIG. 1 (step 408).

A look-up table is obtained (step 410). The look-up table represents a relationship between the state of charge and the RESS temperature for the cooling or heating mode, whichever is implemented at the time based on steps 204-208 described above. Specifically, the look-up table preferably represents a target range of RESS temperature values for each value of the RESS state of charge. The look-up table may be previously generated. The look-up table is preferably stored in the memory 156 of FIG. 1 as stored values 166 thereof, and is preferably retrieved by the memory 156 from the processor 154 of FIG. 1 during step 410. In one embodiment, the look-up table may comprise an algorithm with steps used to obtain the respective values.

RESS inputs are obtained (step 412). The RESS inputs are preferably measured by the RESS sensors 147 of FIG. 1 and provided to the controller 146 of FIG. 1, and most preferably to the processor 154 thereof, for processing. The RESS inputs preferably include an RESS temperature measured by an RESS temperature sensor 148 of FIG. 1 along with RESS current and/or voltage values measured by one or more additional RESS sensors 150 of FIG. 1. As used throughout this application, the RESS temperature preferably comprises a temperature within the RESS 122 of FIG. 1.

A state of charge of the RESS is determined (step 414). Preferably, the RESS state of charge is estimated by the processor 154 of FIG. 1 based on the RESS inputs of step 412. In one such embodiment, the RESS state of charge is estimated based on RESS current values from step 412 using techniques known in the art, for example by integrating the RESS current over time. In another such embodiment, the RESS state of charge is estimated based on RESS voltage values using techniques known in the art, for example using a known discharge curve of voltage versus state of charge for the RESS. In one embodiment, the RESS state of charge is determined using a Kalman filter; however, this may vary in other embodiments. In certain embodiments, the state of charge may be estimated using techniques described in commonly assigned U.S. patent application Ser. No. 12/238,204 (entitled "Method and System for Determining a State of Charge of a Battery", filed Sep. 25, 2008), Ser. No. 12/238,224 (entitled "Method and System for Determining a State of Charge of a Battery Based on a Transient Response", filed Sep. 25, 2008), and/or Ser. No. 11/947,466 (entitled "Method and System for Determining a State of Charge of a Battery", filed Nov. 29, 2007), each of these three applications incorporated herein by reference. However, in other embodiments, any number of other techniques may be utilized in estimating the state of charge.

An RESS target temperature range is determined (step 416). The RESS target temperature range preferably comprises a lower temperature limit and an upper temperature limit for the RESS under current operating conditions. The RESS target temperature range (including both the lower temperature limit and the upper temperature limit) are dependent upon the RESS state of charge. The RESS target temperature range is preferably determined by the processor 154 of FIG. 1 using the look-up tables of step 410, and based on the state of charge estimation of step 414.

In a preferred embodiment, while the cooling mode is in effect (as initiated in step 406), the upper and lower RESS target temperature limits increase after the RESS state of charge falls below a predetermined state of charge threshold in order to conserve RESS energy for powering the vehicle (instead of for use in cooling the RESS) when the state of charge is relatively low. Conversely, in a preferred embodiment, while the heating mode is in effect (as initiated in step 408), the upper and lower RESS target temperature limits decrease after the RESS state of charge falls below the predetermined state of charge threshold in order to conserve RESS energy for powering the vehicle (instead of for use in heating the RESS) when the state of charge is relatively low.

The RESS is thermally conditioned (step 418). Specifically, the RESS is thermally conditioned in order to remain within the target temperature range of step 416, as described in greater detail further below. In addition, the process returns to step 412, as updated RESS inputs continue to be measured and obtained, preferably continuously throughout a drive cycle of the vehicle. Steps 412-418 repeat, preferably continuously, throughout the drive cycle, so that the RESS is thermally conditioned based on dynamic, real-time target temperature limits that are dependent upon dynamic, real-time RESS state of charge estimates.

The thermal conditioning of step 418 is preferably performed by a thermal conditioning system 138 of FIGS. 1-3 based on instructions provided thereto by the controller 146 of FIG. 1, and most preferably to the processor 154 thereof. The RESS is preferably conditioned in accordance with a thermal conditioning strategy (such as turning a compressor and/or heat exchanger off and on, adjusting a fan speed, a pump speed, a flow rate for a coolant fluid, a measure of heat exchanger operation, and/or one or more other actions described above in connection with the thermal conditioning systems 138 of FIGS. 1-3, and/or one or more other actions that may affect the heating or cooling provided by the thermal conditioning system 138 of FIGS. 1-3) that are designed to cause the temperature inside the RESS to remain between the upper temperature limit and the lower target temperature limit of step 416.

The techniques for the thermal conditioning vary based upon whether the cooling mode of step 406 or the warming mode of step 408 is selected. For example, if the cooling mode of step 406 is selected, selective cooling of the RESS is used to keep the RESS temperature within its desired range. Conversely, if the heating mode of step 408 is selected, selective heating of the RESS is used to keep the RESS temperature within its desired range. In one preferred embodiment, the thermal control strategy utilizes corresponding steps from or similar to those described in connection with co-pending, commonly assigned U.S. patent application Ser. No. 12/894,553, entitled Thermal Management Controls for a Vehicle Having a Rechargeable Energy Storage System and/or co-pending, commonly assigned U.S. patent application Ser. No. 13/156,255, entitled Thermal Conditioning of Vehicle Rechargeable Energy Storage Systems, both of which are incorporated by reference herein.

Figure 5:
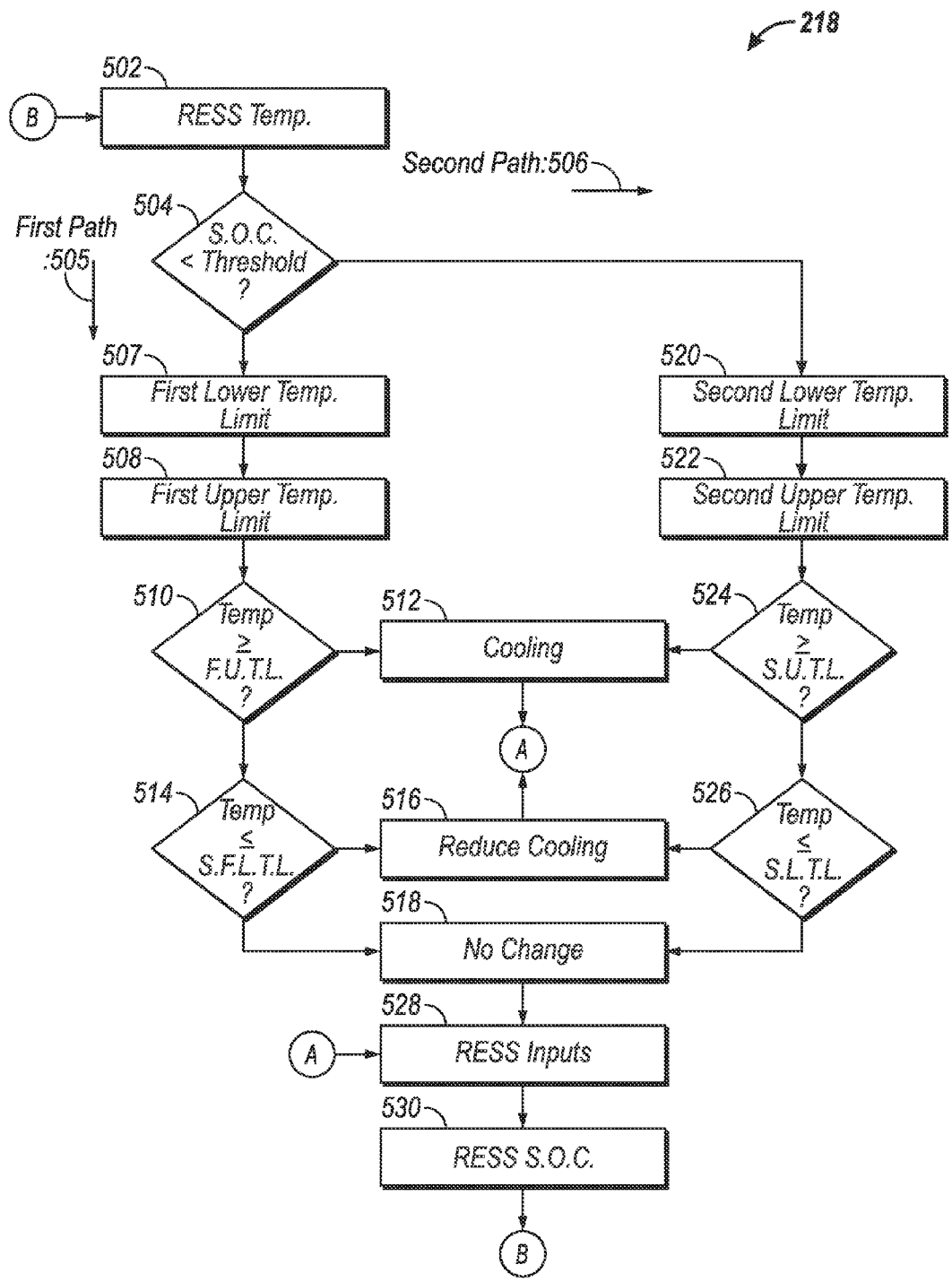
FIG. 5 is a flowchart of a step or sub-algorithm of the process of FIG. 4, namely the step or sub-algorithm of thermally maintaining an RESS temperature within a desired range during relatively warm environmental conditions, in accordance with an exemplary embodiment.

With reference to FIGS. 5 and 7, an exemplary implementation is provided for the thermal conditioning of the RESS of step 418 of FIG. 4 (and with information pertaining as well to other steps of the process 400 of FIG. 4) for situations in which the cooling mode of step 406 of FIG. 4 is implemented, in accordance with an exemplary embodiment.

As depicted in FIG. 5, an RESS temperature is obtained (step 502). The RESS temperature preferably pertains to a temperature inside the RESS 122 of FIG. 1. The RESS temperature is preferably measured by an RESS temperature sensor 148 of FIG. 1 and provided to the processor 154 of FIG. 1 for processing as part of the RESS inputs of step 412 of FIG. 4.

A determination is then made as to whether the RESS state of charge (determined from step 414 of FIG. 4) is less than a predetermined threshold (step 504). This determination is preferably made by the processor 154 of FIG. 1. The predetermined threshold of step 504 preferably pertains to an RESS state of charge value such that, if the RESS state of charge is below such value, the capacity of the RESS to power the vehicle for a desired amount of time (for example, to reach a desired destination) may be compromised.

If it is determined that the RESS state of charge is less than the predetermined threshold of step 504, then the process proceeds along a first path 505, described directly below, in which RESS energy is conserved for use in propelling the vehicle. Conversely, if it is determined that the RESS state of charge is greater than or equal to the predetermined threshold of step 504, then the process proceeds instead along a second path 506, described further below, in which RESS energy is utilized in a relatively greater matter (as compared to the first path 504) for cooling the RESS.

During the first path 505 (specifically, when the RESS state of charge is determined to be less than the predetermined threshold of step 504), a first lower temperature limit is selected for the target RESS temperature range (step 507). The target RESS temperature range preferably corresponds to the target temperature range of step 416 of FIG. 4. In addition, a first upper temperature limit is selected for the target RESS temperature range (step 508). The first lower temperature limit and the second lower temperature limit are preferably determined by the processor 154 of FIG. 1 using the look-up table of step 410 of FIG. 4.

A determination is made as to whether the RESS temperature of step 502 is greater than or equal to the first upper temperature limit of step 508 (step 510). This determination is preferably made by the processor 154 of FIG. 1.

If it is determined that the RESS temperature is greater than or equal to the first upper temperature limit, then cooling is provided for the RESS (step 512). Preferably, the RESS 122 of FIG. 1 is cooled by a thermal conditioning system 138 of FIGS. 1-3 based on instructions provided by the processor 154 of FIG. 1, using one of the above-referenced thermal conditioning strategies of the thermal conditioning system 138. In one preferred embodiment, during step 512, the thermal conditioning system 138 of FIG. 1 turns on the compressor 218 of FIG. 2 or 3 based on instructions provided by the processor 154 of FIG. 1. The process then proceeds to step 528, described further below.

Conversely, if it is determined that the RESS temperature is less than the first upper temperature limit, then a determination is made as to whether the RESS temperature of step 502 is less than or equal to the first lower temperature limit of step 507 (step 514). This determination is preferably made by the processor 154 of FIG. 1.

If it is determined that the RESS temperature is less than or equal to the first lower temperature limit, then the cooling of step 512, to the extent that it may be currently provided, is reduced or terminated (step 516). In one preferred embodiment, during step 512, the thermal conditioning system 138 of FIG. 1 turns off the compressor 218 of FIG. 2 or 3 (if the compressor 218 is currently turned on) based on instructions provided by the processor 154 of FIG. 1. The process then proceeds to step 528, described further below. In other exemplary embodiments, the cooling may be performed instead using a fan, a radiator, and/or one or more other devices.

Conversely, if it is determined that the RESS temperature is greater than the first lower temperature limit, then no changes in thermally conditioning are implemented (step 518). Specifically, any ongoing cooling of the RESS (or lack thereof) is maintained in step 518, preferably via instructions provided to the thermal conditioning system 138 of FIG. 1 by the processor 154 of FIG. 1. The process then proceeds to step 528, described further below.

During step 528, updated RESS inputs are obtained. The updated RESS inputs of step 528 preferably comprise updated values of the same types of measurements from step 412 of FIG. 4 (such as RESS temperature, current, and/or voltage inputs), and are preferably measured by the RESS sensors 147 of FIG. 1 and provided to the processor 154 of FIG. 1. In addition, an updated RESS state of charge is determined (step 530), preferably by the processor 154 of FIG. 1 from the updated RESS inputs of step 528 (similar to step 414 of FIG. 4). An updated RESS temperature is also determined from the updated RESS inputs in a new iteration of step 502, preferably by the processor 154 of FIG. 1. Steps 502-530 thereafter repeat using the updated RESS state of charge and temperature values, and using updated temperature limits of steps 507, 508 or 520, 522 depending upon the current or most recent value of the current state of charge. Steps 502-530 preferably repeat in this manner, most preferably continuously, throughout the drive cycle of the vehicle.

During the first path 505 (specifically, when the RESS state of charge is determined to be less than the predetermined threshold of step 504), a first lower temperature limit is selected for the target RESS temperature range (step 507). The target RESS temperature range preferably corresponds to the target temperature range of step 416 of FIG. 4. In addition, a first upper temperature limit is selected for the target RESS temperature range. The first lower temperature limit and the second lower temperature limit are preferably determined by the processor 154 of FIG. 1 using the look-up table of step 410 of FIG. 4.

A determination is made as to whether the RESS temperature of step 502 is greater than or equal to the first upper temperature limit of step 508 (step 510). This determination is preferably made by the processor 154 of FIG. 1.

If it is determined that the RESS temperature is greater than or equal to the first upper temperature limit, then cooling is provided for the RESS (step 512). Preferably, the RESS 122 of FIG. 1 is cooled by a thermal conditioning system 138 of FIGS. 1-3 based on instructions provided by the processor 154 of FIG. 1, using one of the above-referenced thermal conditioning strategies of the thermal conditioning system 138. In one preferred embodiment, during step 512, the thermal conditioning system 138 of FIG. 1 turns on the compressor 218 of FIG. 2 or 3 based on instructions provided by the processor 154 of FIG. 1. The process then proceeds to step 528, described further below.

Conversely, if it is determined that the RESS temperature is less than the first upper temperature limit, then a determination is made as to whether the RESS temperature of step 502 is less than or equal to the first lower temperature limit of step 507 (step 514). This determination is preferably made by the processor 154 of FIG. 1.

If it is determined that the RESS temperature is less than or equal to the first lower temperature limit, then the cooling of step 512, to the extent that it may be currently provided, is reduced or terminated (step 516). In one preferred embodiment, during step 516, the thermal conditioning system 138 of FIG. 1 turns off the compressor 218 of FIG. 2 or 3 (if the compressor 218 is currently turned on) based on instructions provided by the processor 154 of FIG. 1. The process then proceeds to step 528, described further below.

Conversely, if it is determined that the RESS temperature is greater than the first lower temperature limit, then no changes in thermally conditioning are implemented (step 518). Specifically, any ongoing cooling of the RESS (or lack thereof) is maintained in step 518, preferably via instructions provided to the thermal conditioning system 138 of FIG. 1 by the processor 154 of FIG. 1. The process then proceeds to step 528, described further below.

With reference again to step 504, if the second path 506 is followed (namely, if it is determined in step 504 that the state of charge is greater than or equal to the predetermined threshold), a second lower temperature limit is selected for the target RESS temperature range (step 520). The target RESS temperature range preferably corresponds to a target temperature range of step 416 of FIG. 4. In addition, a second upper temperature limit is selected for the target RESS temperature range (step 522). The second lower temperature limit of step 520 is preferably greater than the first lower temperature limit of step 507. In addition, the second upper temperature limit of step 522 is preferably greater than the first upper temperature limit of step 508. The second lower temperature limit and the second lower temperature limit are preferably determined by the processor 154 of FIG. 1 using the look-up table of step 410 of FIG. 4.

A determination is made as to whether the RESS temperature of step 502 is greater than or equal to the second upper temperature limit of step 522 (step 524). This determination is preferably made by the processor 154 of FIG. 1.

If it is determined that the RESS temperature is greater than or equal to the second upper temperature limit, then the process proceeds to the above-described step 512, in which cooling is provided for the RESS. As mentioned above, preferably the RESS 122 of FIG. 1 is cooled by a thermal conditioning system 138 of FIGS. 1-3 based on instructions provided by the processor 154 of FIG. 1, and in one embodiment the thermal conditioning system 138 of FIG. 1 turns on the compressor 218 of FIG. 2 or 3 based on instructions provided by the processor 154 of FIG. 1 in step 512. The process then proceeds to step 528, described further below.

Conversely, if it is determined that the RESS temperature is less than the second upper temperature limit, then a determination is made as to whether the RESS temperature of step 502 is less than or equal to the second lower temperature limit of step 520 (step 526). This determination is preferably made by the processor 154 of FIG. 1.

If it is determined that the RESS temperature is less than or equal to the second lower temperature limit, then the process returns to the above-described step 516. As mentioned above, during step 516, any RESS cooling of step 512, to the extent that it may be currently provided, is reduced or terminated. In one preferred embodiment, during step 516, the thermal conditioning system 138 of FIG. 1 turns off the compressor 218 of FIG. 2 or 3 (if the compressor 218 is currently turned on) based on instructions provided by the processor 154 of FIG. 1. The process then proceeds to step 528, described further below.

Conversely, if it is determined that the RESS temperature is greater than the second lower temperature limit, then the process proceeds instead to the above-referenced step 518, as no changes in thermally conditioning are implemented. The process then proceeds to step 528, described directly below.

During step 528, updated RESS inputs are obtained. The updated RESS inputs of step 528 preferably comprise updated values of the same types of measurements from step 412 of FIG. 4 (such as RESS temperature, current, and/or voltage inputs), and are preferably measured by the RESS sensors 147 of FIG. 1 and provided to the processor 154 of FIG. 1. In addition, an updated RESS state of charge is determined (step 530), preferably by the processor 154 of FIG. 1 from the updated RESS inputs of step 528 (similar to step 414 of FIG. 4). An updated RESS temperature is also determined from the updated RESS inputs in a new iteration of step 502, preferably by the processor 154 of FIG. 1. Steps 502-530 thereafter repeat using the updated RESS state of charge and temperature values, and using updated temperature limits of steps 507, 508 or 520, 522 depending upon the current or most recent value of the current state of charge. Steps 502-530 preferably repeat in this manner, most preferably continuously, throughout the drive cycle of the vehicle.

FIG. 7 provides a graphical illustration of the implementation of the sub-process of FIG. 5, for when the RESS is in a cooling mode, in accordance with an exemplary embodiment. Specifically, FIG. 7 depicts an RESS state of charge 700, an RESS temperature 702, a lower temperature limit 704 for the RESS, and an upper temperature limit 706 for the RESS. The x-axis represents time, and the y-axis represents temperature and state of charge. As shown in FIG. 7, the temperature limits change after the state of charge 700 falls below a predetermined threshold, represented by point 710 in FIG. 7. After point 710 (corresponding to upper temperature limit point 712 and lower temperature limit point 714), the lower and upper temperature limits 704, 706 increase, to allow more power for the RESS to propel the vehicle instead of cooling the RESS. In the particular example of FIG. 7, the upper and lower temperature limits level off at respective points 716, 718 of FIG. 7, when the RESS temperatures would otherwise exceed maximum temperature limits for the RESS.

The thermal cooling of the RESS can also be tracked in FIG. 7 in accordance with an exemplary embodiment. For example, at point 720 of the RESS temperature 702 (for example, when the drive cycle begins), RESS cooling begins immediately, as the RESS temperature 702 is greater than the upper temperature limit 706. Subsequently, at point 722 of the RESS temperature 702, RESS cooling ceases, as the RESS temperature 702 has reached the lower temperature limit 704. Then, at point 724 of the RESS temperature 702, RESS cooling is initiated again, as the RESS temperature 702 has reached the upper temperature limit 706. Later, at point 726 of the RESS temperature 702, RESS cooling is ceased again, as the RESS temperature 702 has reached the lower temperature limit 704. Subsequently, at point 728 of the RESS temperature 702, RESS cooling begins again, as the RESS temperature 702 has reached the upper temperature limit 706.

As illustrated in FIG. 7, the selective cooling of the RESS, while in the RESS cooling mode, maintains the RESS temperature within the desired temperature range, as defined between the lower temperature limit 704 and the upper temperature limit 706. The lower and upper temperature limits 704, 706 increase after the RESS state of charge 700 falls below the predetermined threshold of point 710 in order to provide relatively more energy for the RESS to power the vehicle, (while still keeping the battery within its operating limits) as opposed to energy usage for thermal conditioning, for example to help ensure that the vehicle reaches its desired destination. While the target temperature range is depicted in FIG. 7 as generally increasing after the RESS state of charge 700 falls below the predetermined threshold of point 710 until the RESS temperature reaches a maximum allowable value, in other embodiments the relationship between the RESS state of charge and the target temperature range may differ. For example, in certain embodiments, the lower and upper temperature limits 704, 706 may have a quadratic functional relationship, a step-wise relationship, and/or one or more other relationships (preferably, one or more non-linear relationships) with the RESS state of charge.

Figure 6:
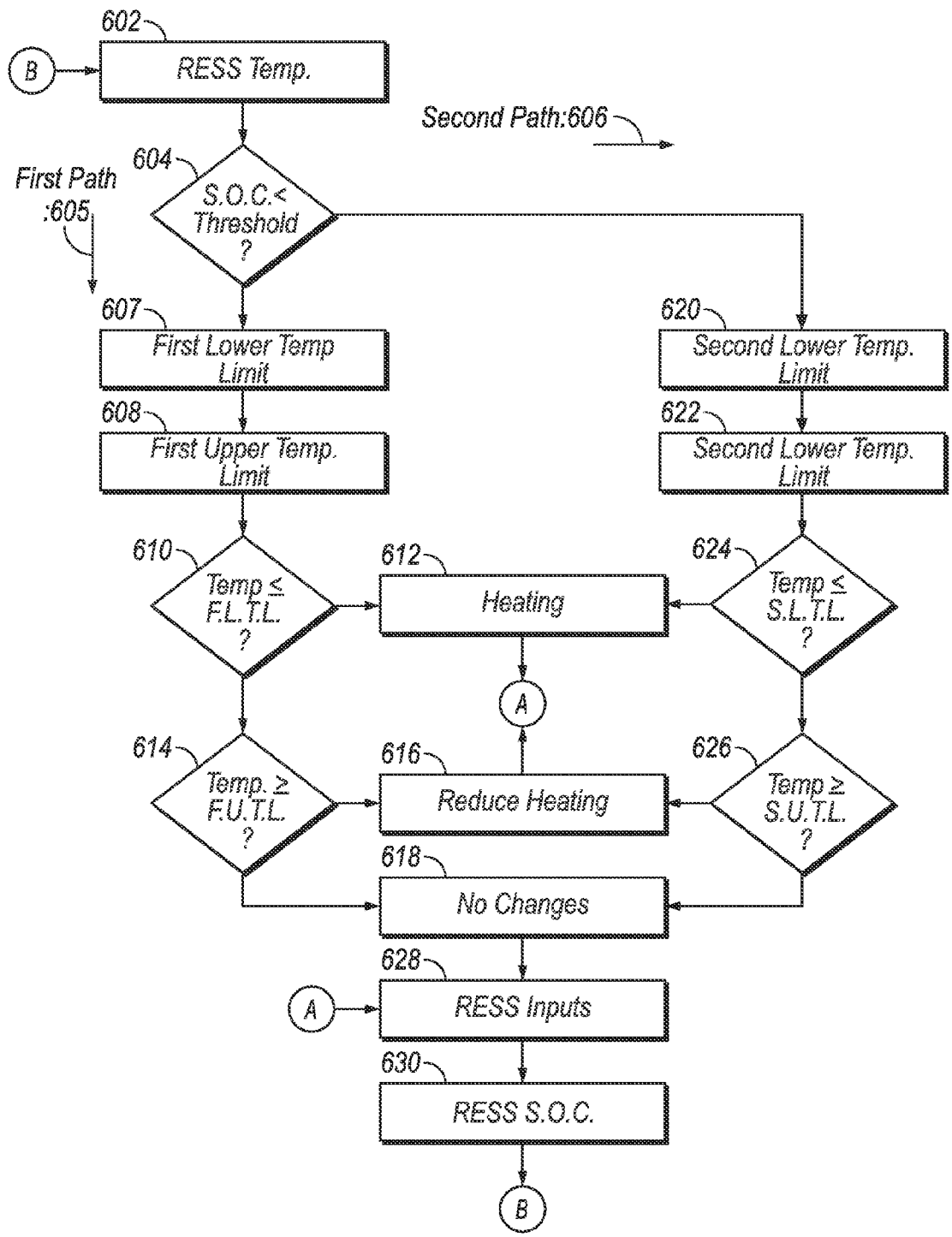
FIG. 6 is a flowchart of a step or sub-algorithm of the process of FIG. 4, namely the step or sub-algorithm of thermally maintaining an RESS temperature within a desired range during relatively cool environmental conditions, in accordance with an exemplary embodiment.

With reference to FIGS. 6 and 8, an exemplary implementation is provided for the thermal conditioning of the RESS of step 418 of FIG. 4 (and with information pertaining as well to other steps of the process 400 of FIG. 4) for situations in which the heating mode of step 408 of FIG. 4 is implemented, in accordance with an exemplary embodiment.

As depicted in FIG. 6, an RESS temperature is obtained (step 602). The RESS temperature preferably pertains to a temperature inside the RESS 122 of FIG. 1. The RESS temperature is preferably measured by an RESS temperature sensor 148 of FIG. 1 and provided to the processor 154 of FIG. 1 for processing as part of the RESS inputs of step 412 of FIG. 4.

A determination is then made as to whether the RESS state of charge (determined from step 414 of FIG. 4) is less than a predetermined threshold (step 604). This determination is preferably made by the processor 154 of FIG. 1. The predetermined threshold of step 604 preferably pertains to an RESS state of charge value such that, if the RESS state of charge is below such value, the capacity of the RESS to power the vehicle for a desired amount of time may be compromised.

If it is determined that the RESS state of charge is less than the predetermined threshold of step 604, then the process proceeds along a first path 605, described directly below, in which RESS energy is conserved for use in propelling the vehicle. Conversely, if it is determined that the RESS state of charge is greater than or equal to the predetermined threshold of step 604, then the process proceeds instead along a second path 606, described further below, in which RESS energy is utilized in a relatively greater matter (as compared to the first path 604) for heating the RESS.

During the first path 605 (specifically, when the RESS state of charge is determined to be less than the predetermined threshold of step 604), a first lower temperature limit is selected for the target RESS temperature range (step 607). The target RESS temperature range preferably corresponds to the target temperature range of step 416 of FIG. 4. In addition, a first upper temperature limit is selected for the target RESS temperature range (step 608). The first lower temperature limit and the second lower temperature limit are preferably determined by the processor 154 of FIG. 1 using the look-up table of step 410 of FIG. 4.

A determination is made as to whether the RESS temperature of step 602 is less than or equal to the first lower temperature limit of step 607 (step 610). This determination is preferably made by the processor 154 of FIG. 1.

If it is determined that the RESS temperature is less than or equal to the first lower temperature limit, then heating is provided for the RESS (step 612). Preferably, the RESS 122 of FIG. 1 is heated by a thermal conditioning system 138 of FIGS. 1-3 based on instructions provided by the processor 154 of FIG. 1, using one of the above-referenced thermal conditioning strategies of the thermal conditioning system 138. In one preferred embodiment, during step 612, the thermal conditioning system 138 of FIG. 1 turns on the heat exchanger 223 of FIG. 2 or 3 based on instructions provided by the processor 154 of FIG. 1. The process then proceeds to step 628, described further below.

Conversely, if it is determined that the RESS temperature is greater than the first lower temperature limit, then a determination is made as to whether the RESS temperature of step 602 is greater than or equal to the first upper temperature limit of step 608 (step 614). This determination is preferably made by the processor 154 of FIG. 1.

If it is determined that the RESS temperature is greater than or equal to the first upper temperature limit, then the heating of step 612, to the extent that it may be currently provided, is reduced or terminated (step 616). In one preferred embodiment, during step 612, the thermal conditioning system 138 of FIG. 1 turns off the heat exchanger 223 of FIG. 2 or 3 (if the heat exchanger 223 is currently turned on) based on instructions provided by the processor 154 of FIG. 1. The process then proceeds to step 628, described further below.

Conversely, if it is determined that the RESS temperature is less than the first upper temperature limit, then no changes in thermally conditioning are implemented (step 618). Specifically, any ongoing heating of the RESS (or lack thereof) is maintained in step 618, preferably via instructions provided to the thermal conditioning system 138 of FIG. 1 by the processor 154 of FIG. 1. The process then proceeds to step 628, described further below.

With reference again to step 604, if the second path 606 is followed (namely, if it is determined in step 604 that the state of charge is greater than or equal to the predetermined threshold), a second lower temperature limit is selected for the target RESS temperature range (step 620). The target RESS temperature range preferably corresponds to a target temperature range of step 416 of FIG. 4. In addition, a second upper temperature limit is selected for the target RESS temperature range (step 622). The second lower temperature limit of step 620 is preferably less than the first lower temperature limit of step 607. In addition, the second upper temperature limit of step 622 is preferably less than the first upper temperature limit of step 608. The second lower temperature limit and the second lower temperature limit are preferably determined by the processor 154 of FIG. 1 using the look-up table of step 410 of FIG. 4.

A determination is made as to whether the RESS temperature of step 602 is less than or equal to the second lower temperature limit of step 620 (step 624). This determination is preferably made by the processor 154 of FIG. 1.

If it is determined that the RESS temperature is less than or equal to the second lower temperature limit, then the process proceeds to the above-described step 612, in which heating is provided for the RESS. As mentioned above, preferably the RESS 122 of FIG. 1 is heated by a thermal conditioning system 138 of FIGS. 1-3 based on instructions provided by the processor 154 of FIG. 1, and in one embodiment the thermal conditioning system 138 of FIG. 1 turns on the heat exchanger 223 of FIG. 2 or 3 based on instructions provided by the processor 154 of FIG. 1 in step 612. The process then proceeds to step 628, described further below.

Conversely, if it is determined that the RESS temperature is greater than the second lower temperature limit, then a determination is made as to whether the RESS temperature of step 602 is greater than or equal to the second upper temperature limit of step 622 (step 626). This determination is preferably made by the processor 154 of FIG. 1.

If it is determined that the RESS temperature is greater than or equal to the second lower temperature limit, then the process returns to the above-described step 616. As mentioned above, during step 616, any RESS heating of step 612, to the extent that it may be currently provided, is reduced or terminated. In one preferred embodiment, during step 616, the thermal conditioning system 138 of FIG. 1 turns off the heat exchanger 223 of FIG. 2 or 3 (if the heat exchanger 223 is currently turned on) based on instructions provided by the processor 154 of FIG. 1. The process then proceeds to step 628, described further below.

Conversely, if it is determined that the RESS temperature is less than the second upper temperature limit, then the process proceeds instead to the above-referenced step 618, as no changes in thermally conditioning are implemented. The process then proceeds to step 628, described directly below.

During step 628, updated RESS inputs are obtained. The updated RESS inputs of step 628 preferably comprise updated values of the same types of measurements from step 412 of FIG. 4 (such as RESS temperature, current, and/or voltage inputs), and are preferably measured by the RESS sensors 147 of FIG. 1 and provided to the processor 154 of FIG. 1. In addition, an updated RESS state of charge is determined (step 630), preferably by the processor 154 of FIG. 1 from the updated RESS inputs of step 628 (similar to step 414 of FIG. 4). An updated RESS temperature is also determined from the updated RESS inputs in a new iteration of step 602, preferably by the processor 154 of FIG. 1. Steps 602-630 thereafter repeat using the updated RESS state of charge and temperature values, and using updated temperature limits of steps 607, 608 or 620, 622 depending upon the current or most recent value of the current state of charge. Steps 602-630 preferably repeat in this manner, most preferably continuously, throughout the drive cycle of the vehicle.

FIG. 8 provides a graphical illustration of the implementation of the sub-process of FIG. 6, for when the RESS is in a heating mode, in accordance with an exemplary embodiment. Specifically, FIG. 8 depicts an RESS state of charge 800, an RESS temperature 802, a lower temperature limit 804 for the RESS, and an upper temperature limit 806 for the RESS. The x-axis represents time, and the y-axis represents temperature and state of charge. As shown in FIG. 8, the temperature limits change after the state of charge 800 falls below a predetermined threshold, represented by point 810 in FIG. 8. After point 810 (corresponding to upper temperature limit point 812 and lower temperature limit point 814), the lower and upper temperature limits 804, 806 decrease, to allow more power for the RESS to propel the vehicle instead of heating the RESS. In the particular example of FIG. 8, the upper and lower temperature limits level off at respective points 816, 818 of FIG. 8, when the RESS temperatures would otherwise fall below minimum temperature limits for the RESS.

The thermal heating of the RESS can also be tracked in FIG. 8 in accordance with an exemplary embodiment. For example, at point 820 of the RESS temperature 802 (for example, when the drive cycle begins), RESS heating begins immediately, as the RESS temperature 802 is less than the lower temperature limit 804. Subsequently, at point 822 of the RESS temperature 802, RESS heating ceases, as the RESS temperature 802 has reached the upper temperature limit 806. Then, at point 824 of the RESS temperature 802, RESS heating is initiated again, as the RESS temperature 802 has reached the lower temperature limit 804. Later, at point 826 of the RESS temperature 802, RESS heating is ceased again, as the RESS temperature 802 has reached the upper temperature limit 806. Subsequently, at point 828 of the RESS temperature 802, RESS heating begins again, as the RESS temperature 802 has reached the lower temperature limit 804. Later, at point 830 of the RESS temperature 802, RESS heating ceases again, as the RESS temperature 802 has reached the upper temperature limit 806. Subsequently, at point 832, RESS heating begins again, as the RESS temperature 802 has reached the lower temperature limit 804.

As illustrated in FIG. 8, the selective heating of the RESS, while in the RESS heating mode, maintains the RESS temperature within the desired temperature range, as defined between the lower temperature limit 804 and the upper temperature limit 806. The lower and upper temperature limits 804, 806 decrease after the RESS state of charge 800 falls below the predetermined threshold of point 810 in order to provide relatively more energy for the RESS to power the vehicle, as opposed to energy usage for thermal conditioning, for example to help ensure that the vehicle reaches its desired destination. While the target temperature range is depicted in FIG. 8 as generally decreasing after the RESS state of charge 800 falls below the predetermined threshold of point 810 until the RESS temperature reaches a minimum allowable value, in other embodiments the relationship between the RESS state of charge and the target temperature range may differ. For example, in certain embodiments, the lower and upper temperature limits 804, 806 may have a quadratic functional relationship, a step-wise relationship, and/or one or more other relationships with the RESS state of charge.

It will be appreciated that the disclosed methods, systems, and vehicles may vary from those depicted in the Figures and described herein. For example, the vehicle 100, the RESS control system 124, the thermal conditioning system 138, and/or various components thereof may vary from that depicted in FIGS. 1-3 and described in connection therewith. In addition, it will be appreciated that certain steps of the process 400 may vary from those depicted in FIGS. 4-8 and/or described above in connection therewith. It will similarly be appreciated that certain steps of the process described above may occur simultaneously or in a different order than that depicted in FIGS. 4-8 and/or described above in connection therewith. It is also noted that methods described herein may also utilized additional factors for controlling the RESS temperature, such as ambient temperature, GPS control, and the like, which may also affect the thresholds used in the methods described herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for thermally conditioning a rechargeable energy storage system (RESS) of a vehicle, the method comprising:
    estimating a state of charge for the RESS using a processor;
    thermally maintaining an RESS temperature of the RESS within a first target temperature range, between a first lower temperature limit and a first upper temperature limit, if the state of charge is greater than a predetermined state of charge threshold; and
    thermally maintaining the RESS temperature within a second target temperature range, between a second lower temperature limit and a second upper temperature limit, if the state of charge is less than the predetermined state of charge threshold, the second target temperature range being different from the first target temperature range, with the first lower temperature limit being different from the second lower temperature limit and the first upper temperature limit being different from the second upper temperature limit.

2. The method of claim 1, wherein the step of maintaining the RESS temperature within the first target temperature range comprises:
    turning on a refrigerant compressor if the RESS temperature is greater than the first upper temperature limit and the state of charge is greater than the predetermined state of charge threshold;
    turning off the refrigerant compressor if the RESS temperature is less than the first lower temperature limit and the state of charge is greater than the predetermined state of charge threshold;
    turning on the refrigerant compressor if the RESS temperature is greater than the second upper temperature limit and the state of charge is less than the predetermined state of charge threshold;
    turning off the refrigerant compressor if the RESS temperature is less than the second lower temperature limit and the state of charge is less than the predetermined state of charge threshold.

3. The method of claim 1, further comprising the step of:
    measuring an ambient temperature, wherein:
        the second upper temperature limit is greater than the first upper temperature limit, and the second lower temperature limit is greater than the first lower temperature limit, if the ambient temperature is greater than an ambient temperature threshold; and
        the second upper temperature limit is less than the first upper temperature limit, and the second lower temperature limit is less than the first lower temperature limit, if the ambient temperature is less than the ambient temperature threshold.

4. The method of claim 1, further comprising:
    measuring an ambient temperature, wherein the step of maintaining the RESS temperature within the first target temperature range comprises:
        if the ambient temperature is greater than an ambient temperature threshold:
            cooling the RESS if the RESS temperature reaches the first upper temperature limit; and
            ceasing the cooling if the RESS temperature reaches the first lower temperature limit; and
        if the ambient temperature is less than the ambient temperature threshold:
            heating the RESS if the RESS temperature reaches the first lower temperature limit; and
            heating the RESS if the RESS temperature reaches the first upper temperature limit.

5. The method of claim 1, wherein:
    the step of thermally maintaining the RESS temperature within the first target temperature range comprises thermally maintaining the RESS temperature between a first minimum temperature value and a first maximum temperature value if the state of charge is greater than the predetermined state of charge threshold; and
    the step of thermally maintaining the RESS temperature within the second target temperature range comprises thermally maintaining the RESS temperature between a second minimum temperature value and a second maximum temperature value if the state of charge is less than the predetermined state of charge threshold, wherein the first minimum temperature value is different from the second minimum temperature value and the first maximum temperature value is different from the second maximum temperature value.

6. A control system for thermally conditioning a rechargeable energy storage system (RESS) of a vehicle during a drive cycle, the control system comprising:
    a thermal conditioning system configured to thermally condition the RESS; and
    a controller coupled to the thermal conditioning system and configured to:
        estimate a state of charge for the RESS;
        thermally maintain an RESS temperature within a first target temperature range, between a first lower temperature limit and a first upper temperature limit, via instructions provided to the thermal conditioning system if the state of charge is greater than a predetermined state of charge threshold; and thermally maintain the RESS temperature within a second target temperature range, between a second lower temperature limit and a second upper temperature limit, via the instructions provided to the thermal conditioning system if the state of charge is less than the predetermined state of charge threshold, the second target temperature range being different from the first target temperature range, with the first lower temperature limit being different from the second lower temperature limit and the first upper temperature limit being different from the second upper temperature limit.

7. The control system of claim 6, wherein the controller is further configured to:

turn on a refrigerant compressor via the instructions provided to the thermal conditioning system if the RESS temperature is greater than the first upper temperature limit and the state of charge is greater than the predetermined state of charge threshold;

turn off the refrigerant compressor via the instructions provided to the thermal conditioning system if the RESS temperature is less than the first lower temperature limit and the state of charge is greater than the predetermined state of charge threshold;

turn on the refrigerant compressor via the instructions provided to the thermal conditioning system if the RESS temperature is greater than the second upper temperature limit and the state of charge is less than the predetermined state of charge threshold;

turn off the refrigerant compressor via the instructions provided to the thermal conditioning system if the RESS temperature is less than the second lower temperature limit and the state of charge is less than the predetermined state of charge threshold.

8. The control system of claim 6, further comprising:
a sensor configured to measure an ambient temperature, wherein:
the second upper temperature limit is greater than the first upper temperature limit, and the second lower temperature limit is greater than the first lower temperature limit, if the ambient temperature is greater than an ambient temperature threshold; and
the second upper temperature limit is less than the first upper temperature limit, and the second lower temperature limit is less than the first lower temperature limit, if the ambient temperature is less than the ambient temperature threshold.

9. The control system of claim 6, further comprising:
a sensor configured to measure an ambient temperature, wherein the controller is further configured to:
if the ambient temperature is greater than an ambient temperature threshold:
cooling the RESS via the instructions provided to the thermal conditioning system if the RESS temperature reaches the first upper temperature limit; and
ceasing the cooling via the instructions provided to the thermal conditioning system if the RESS temperature reaches the first lower temperature limit; and
if the ambient temperature is less than the ambient temperature threshold:

heating the RESS via the instructions provided to the thermal conditioning system if the RESS temperature reaches the first lower temperature limit; and
ceasing the heating via the instructions provided to the thermal conditioning system if the RESS temperature reaches the first upper temperature limit.

10. The control system of claim 6, wherein the controller is configured to:

thermally maintain the RESS temperature within the first target temperature range by maintaining the RESS temperature between a first minimum temperature value and a first maximum temperature value if the state of charge is greater than the predetermined state of charge threshold; and thermally maintaining the RESS temperature within the second target temperature range by thermally maintaining the RESS temperature between a second minimum temperature value and a second maximum temperature value if the state of charge is less than the predetermined state of charge threshold, wherein the first minimum temperature value is different from the second minimum temperature value and the first maximum temperature value is different from the second maximum temperature value.

11. A vehicle comprising:
a drive system including a rechargeable energy storage system (RESS);
a thermal conditioning system coupled to the RESS and configured to thermally condition the RESS; and
a control system coupled to the thermal conditioning system and configured to:
estimate a state of charge for the RESS;
thermally maintain an RESS temperature within a first target temperature range, between a first lower temperature limit and a first upper temperature limit, via instructions provided to the thermal conditioning system if the state of charge is greater than a predetermined threshold; and
thermally maintain the RESS temperature within a second target temperature range, between a second lower temperature limit and a second upper temperature limit, via the instructions provided to the thermal conditioning system if the state of charge is less than the predetermined threshold, the second target temperature range being different from the first target temperature range, with the first lower temperature limit being different from the second lower temperature limit and the first upper temperature limit being different from the second upper temperature limit.

12. The vehicle of claim 11, wherein the control system is further configured to:

turn on a refrigerant compressor via the instructions provided to the thermal conditioning system if the RESS temperature is greater than the first upper temperature limit and the state of charge is greater than the predetermined state of charge threshold;

turn off the refrigerant compressor via the instructions provided to the thermal conditioning system if the RESS temperature is less than the first lower temperature limit and the state of charge is greater than the predetermined state of charge threshold;

turn on the refrigerant compressor via the instructions provided to the thermal conditioning system if the RESS temperature is greater than the second upper temperature limit and the state of charge is less than the predetermined state of charge threshold;

turn off the refrigerant compressor via the instructions provided to the thermal conditioning system if the RESS temperature is less than the second lower temperature limit and the state of charge is less than the predetermined state of charge threshold.

13. The vehicle of claim 11, further comprising:
a sensor configured to measure an ambient temperature, wherein:
   the second upper temperature limit is greater than the first upper temperature limit, and the second lower temperature limit is greater than the first lower temperature limit, if the ambient temperature is greater than an ambient temperature threshold; and
   the second upper temperature limit is less than the first upper temperature limit, and the second lower temperature limit is less than the first lower temperature limit, if the ambient temperature is less than the ambient temperature threshold.

14. The vehicle of claim 11, further comprising:
a sensor configured to measure an ambient temperature, wherein the control system is further configured to:
   if the ambient temperature is greater than an ambient temperature threshold:
      cooling the RESS via the instructions provided to the thermal conditioning system if the RESS temperature reaches the first upper temperature limit; and
      ceasing the cooling via the instructions provided to the thermal conditioning system if the RESS temperature reaches the first lower temperature limit; and
   if the ambient temperature is less than the ambient temperature threshold:
      heating the RESS via the instructions provided to the thermal conditioning system if the RESS temperature reaches the first lower temperature limit; and
      ceasing the heating via the instructions provided to the thermal conditioning system if the RESS temperature reaches the first upper temperature limit.

15. The vehicle of claim 11, wherein the control system is configured to:
   thermally maintain the RESS temperature within the first target temperature range by maintaining the RESS temperature between a first minimum temperature value and a first maximum temperature value if the state of charge is greater than the predetermined state of charge threshold; and
   thermally maintaining the RESS temperature within the second target temperature range by thermally maintaining the RESS temperature between a second minimum temperature value and a second maximum temperature value if the state of charge is less than the predetermined state of charge threshold, wherein the first minimum temperature value is different from the second minimum temperature value and the first maximum temperature value is different from the second maximum temperature value.

* * * * *